Oct. 21, 1930.   L. A. ELMER   1,778,756
COUPLING DEVICE
Filed Aug. 9, 1927   2 Sheets-Sheet 1

INVENTOR
LLOYD A. ELMER
BY Walter C. Kiesel
ATTORNEY

Oct. 21, 1930.  L. A. ELMER  1,778,756
COUPLING DEVICE
Filed Aug. 9, 1927   2 Sheets-Sheet 2

INVENTOR
LLOYD A. ELMER
BY Walter C. Kiesel
ATTORNEY

Patented Oct. 21, 1930

1,778,756

UNITED STATES PATENT OFFICE

LLOYD A. ELMER, OF EAST ORANGE, NEW JERSEY, ASSIGNOR TO BELL TELEPHONE LABORATORIES, INCORPORATED, OF NEW YORK, N. Y., A CORPORATION OF NEW YORK

COUPLING DEVICE

Application filed August 9, 1927. Serial No. 211,746.

This invention relates to coupling devices and more particularly to such devices adapted to transmit rotary motion from a driving member to a driven member of a mechanical system.

An object of the invention is to prevent the transmission of extraneous vibrations from the driving member to the driven member of a mechanical drive system.

This object is accomplished in accordance with a broad aspect of the invention by means of a coupling comprising a fluid damped resilient filter or vibration absorbing member connected to the driving and driven members of a mechanical drive system and which forms a container for the damping fluid.

A more specific aspect of the invention comprises a mechanical drive for a phonograph in which a driving gear is loosely carried by the turntable shaft, and a cylindrically enclosed resilient member comprising two chambers or bellows connected by a member having a restricted passageway, is supported on the driving gear and connected to the driven shaft, to transmit uniform rotary motion to the driven shaft and perform the functions of a low pass filter. A suitable damping fluid, such as air, water or oil is contained in the chambers and forms an energy dissipating medium when forced from one chamber to the other. This arrangement prevents the transmission of irregular rotary motion, such as would occur from imperfections in the gear teeth, frictioned forces exerted on the shaft by the turntable, or other vibratory motion.

A feature of the invention relates to the adjustment of the restricted passageway between the two resilient chambers, to control the flow of the damping medium from one chamber to the other. This arrangement comprises a screw valve projecting into the connecting member of the two chambers to regulate the opening in the connecting member.

Another feature of the invention relates to the resilient connection of the fluid damping device to the driven shaft to prevent the distortion of the resilient chambers by a twisting motion.

These and other features of the invention are shown in the accompanying drawing and are described in the following specification.

Figure 1:
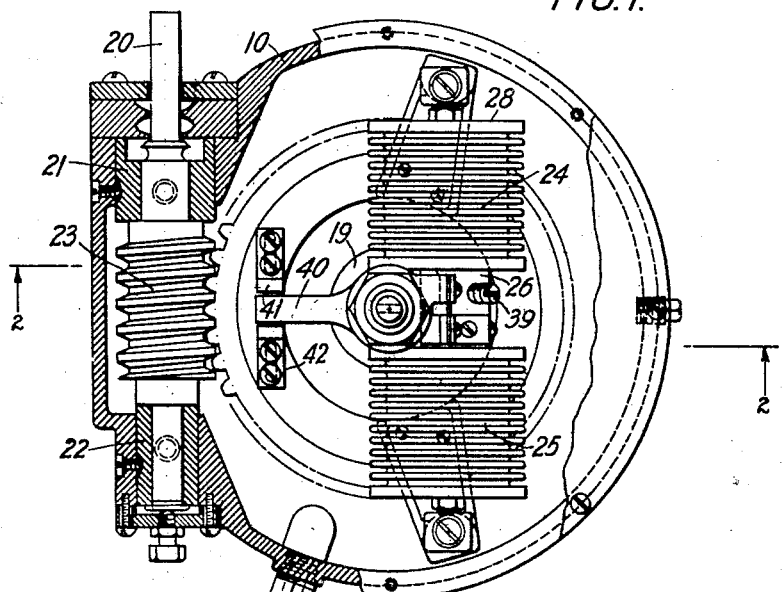
Fig. 1 is an interior plan view of a phonograph drive showing the arrangement of the resilient damping coupling between the driving gear and the driven shaft in accordance with this invention.
Figure 2:
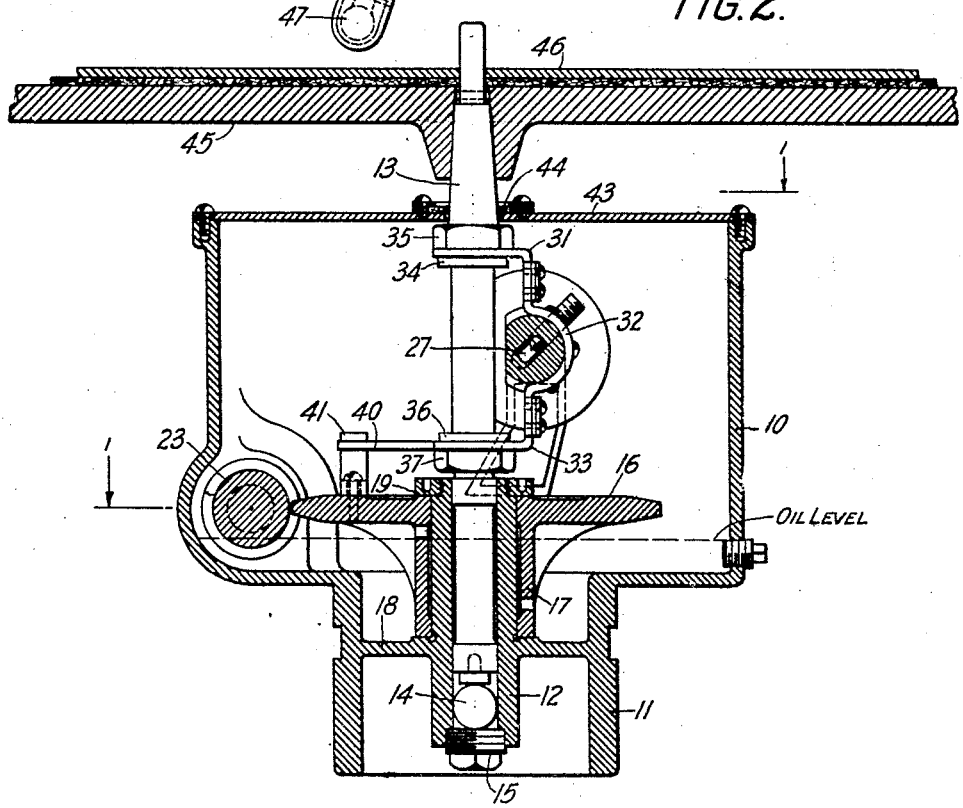
Fig. 2 is a side view of Fig. 1 partly in cross-section showing the apertured connection between the chambers of the damping coupling and the position of the adjusting screw valve.
Figure 3:
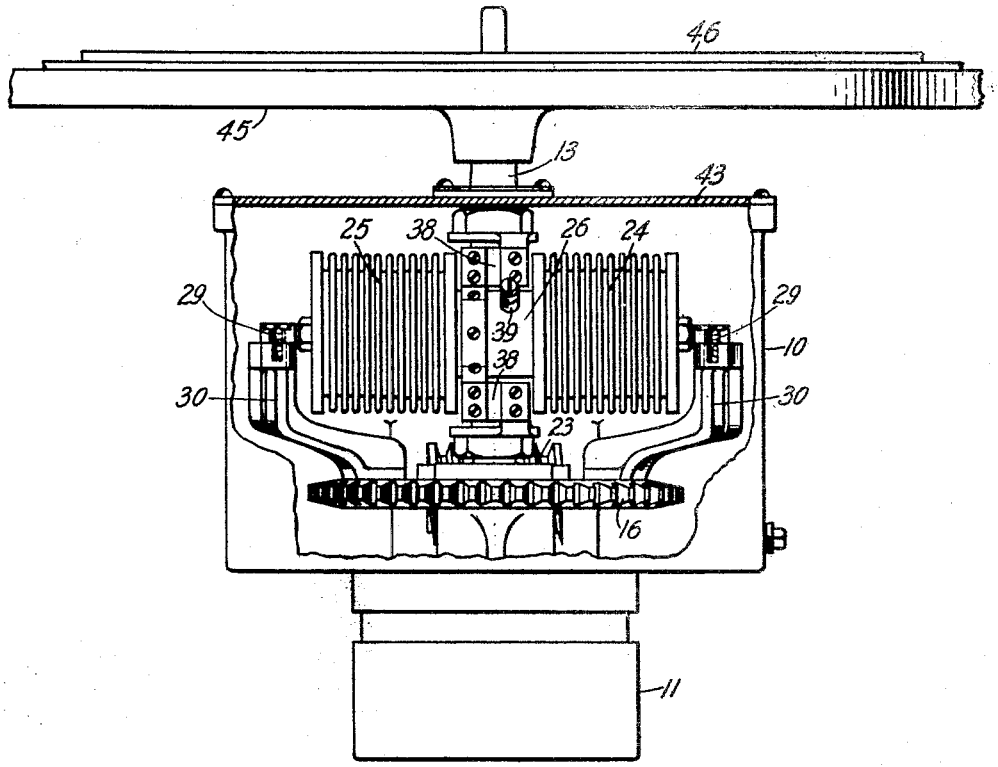
Fig. 3 is a front view in elevation showing the resilient connection of the damping coupling to the driven shaft.

Referring to Figs. 1, 2 and 3 of the drawing, the mechanical drive system of the phonograph turntable comprises a cylindrical housing 10, preferably of cast metal, having a base portion 11 from which is supported a tubular bearing 12 having a portion extending within the housing 10. A turntable drive shaft 13 is seated in the bearing 12 and is supported therein by means of the ball 14 and the threaded plug 15. A gear 16 loosely surrounds the bearing 12 within the housing and is provided with a cylindrical hub 17 which is seated on the flange 18 of the base portion 11. A retaining nut 19 is threaded on the upper end of the bushing and extends over the inner edge of the gear 16 to prevent the vertical movement of the gear. A driving shaft 20 extends horizontally through the lower end of the casing and rotates in suitable bearings 21 and 22 at either end of the shaft. A worm gear 23 intermediate the ends of the drive shaft 20 meshes with the gear 16 to impart rotary movement thereto. The driven gear 16 and the shaft 13, however, are not directly coupled together since it is the purpose of this invention to prevent any irregularities in the gear teeth or the driving means from being transmitted to the driven shaft 13. This is accomplished in accordance with this invention by a fluid damped coupling which is resiliently attached to the driven shaft 13 and rigidly attached to the gear 16. This coupling device comprises a pair of cylindrical chambers 24 and 25 of resilient material. These chambers are preferably made of thin metallic cylinders having corrugated walls of the accordion type. The cylinders are arranged in series and their inner ends are connected by a spool structure 26 comprising circular end portions which fit into the ends of the resilient cylinders and are sealed thereto by soldering The cylindrical portion of the spool is provided with an aperture 27 which forms a communicating passageway from one cylinder to the other. The outer end of each cylinder is sealed by a circular disc 28 to which is attached an outwardly extending supporting lug 29. The enclosed chambers form suitable resilient bellows members for dissipating irregular motion transmitted by the gear 16. An angular arm 30 having one end rigidly attached to the gear 16 extends beyond the edge of the gear and is attached to the supporting lug 29 of the resilient chambers. The resilient chambers or bellows 24 and 25 are located on either side of the driven shaft 13 and are attached thereto by means of bridge members 31, 32 and 33. The bridge member 31 is rigidly fastened to the driven shaft 13 adjacent the upper end of the housing 10 by means of the shoulder 34 and the nut 35 and the bridge member 33 is attached to the driven shaft 13 by the shoulder 36 and nut 37. The intermediate semi-circular portion of the bridge member 32 is rigidly fastened to the cylindrical portion of the spool 26 by means of screws and the upper and lower ends of the bridge member 32 are respectively connected to the bridge members 31 and 33 by means of resilient strips 38. This arrangement forms an efficient coupling device between the driven gear 16 and the driven shaft 13. The resilient chambers 24 and 25 may be filled with a suitable damping fluid such as water, oil or air thereby forming a suitable container for the damping fluid. An adjustable screw 39 extending into the aperture 27 in the spool 26 provides means for regulating the flow of fluid from one chamber to the other. The extension arm 40 on the bridge member 31 is located between adjustable stop members 41 and 42 attached to the gear 16 in order to prevent overstrain on the bellows members 24 and 25. Attached to the upper end of the casing 10 and surrounding the driven shaft 13 is a cover plate 43 and a suitable felt washer 44 surrounds the driven shaft 13 and is attached to the cover by means of screws. The phonograph turntable 45 is seated on the upper end of the driven shaft 13 and carries a record 46. A suitable oil cup 47 is threaded into the side of the casing to fill the casing with the proper amount of oil. This invention provides a coupling device which transmits uniform rotary motion to the driven shaft 13 carrying the turntable and if for any reason irregular driving motion or frictional forces on the shaft are transmitted to the coupling device, this motion or force sets up compression in one of the chambers and elongation in the other chamber so that the damping fluid therein is forced from one chamber to the other and the energy is dissipated in the damping fluid and is not transmitted to the driven shaft 13. Furthermore, the resilient connection between the driven shaft and the chambers prevents distortion of the chambers due to any twisting motion.

Figure 4:
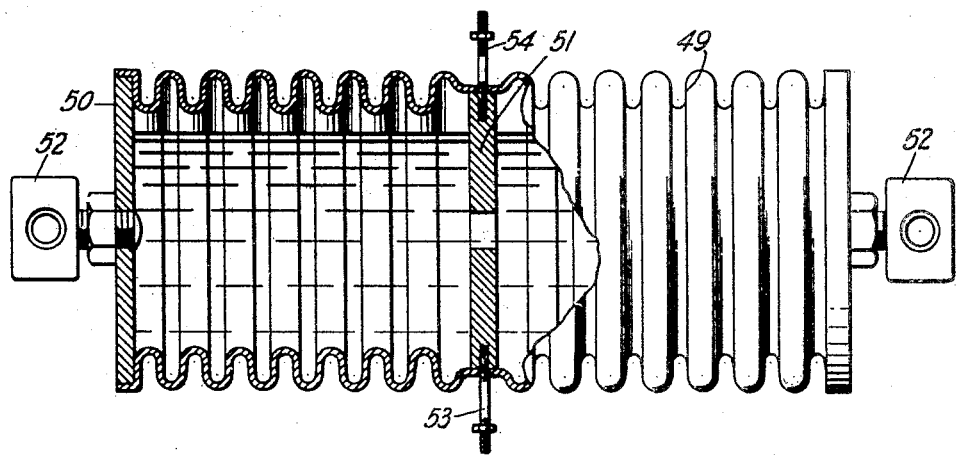
Fig. 4 is a view partly in cross-section of a modified resilient damping coupling made in accordance with this invention.

The invention is not limited to the specific details of the structure disclosed since various modifications may be made within the scope of the invention. For instance, as shown in Fig. 4, the resilient coupling member may be formed on a single corrugated cylinder 49 having each end closed by a disc 50 and an apertured disc 51 positioned intermediate the ends of the cylinder. The damping fluid may be forced from one side of the cylinder to the other in the same manner as described in connection with Fig. 1. Suitable mounting lugs 52 extend from the discs 50 and provide means for attaching the coupling member to the driven gear. The threaded members 53 and 54 extending from the apertured disc 51 form a suitable connection for a yoke member attached to the drive shaft of a mechanical system.

What is claimed is:

1. The combination of a mechanical system, having rotatable driving and driven members, with means coupling said members comprising an enclosed elastic member containing a fluid, said member having its ends rigidly connected to said driving member and a point intermediate its ends resiliently connected to said driven member.

2. In a mechanical system, a rotatable driving member, a rotatable driven member, vibration absorbing means coupling said members, comprising a pair of enclosed elastic members each rigidly attached at one end to said driving member, means interconnecting the other ends of said elastic members, and means resiliently connecting said means to said driven member.

3. In a mechanical system, a rotatable driven member, a rotatable driving member, vibration absorbing means coupling said members comprising a cylindrical bellows containing a fluid, said member having its ends rigidly connected to one of said members, and a point intermediate its ends resiliently connected to the other of said members.

4. In combination with a mechanical system, having a rotatable driving and a rotatable driven member, of means coupling said members, comprising a pair of enclosed elastic members containing a damping fluid, each of said members having one end rigidly attached to one of said rotatable members, means interconnecting the other ends of said elastic members, and means resiliently connecting said interconnecting means to the other of said rotatable members.

5. In a mechanical system, a rotatable driving member, a rotatable driven member, vibration absorbing means coupling said members, comprising a cylindrical bellows having its ends rigidly attached to one of said members, and means resiliently connecting a point intermediate its ends to the other of said members, said means comprising a plurality of resilient strips or reeds.

6. A mechanical system comprising a pair of rotatable elements and means coupling said elements comprising an enclosed fluid damped elastic member having its ends rigidly attached to one of said elements and a point intermediate its ends resiliently attached to the other of said elements.

7. In a mechanical system, a rotatable driving member, a rotatable driven member, vibration absorbing means coupling said members, comprising a cylindrical bellows having its ends rigidly attached to one of said members, and a point intermediate its ends resiliently attached to the other of said members, and means located at said intermediate point to limit the strain applied to said vibration absorbing means.

8. A mechanical system comprising a pair of rotatable elements and means coupling said elements comprising an enclosed fluid damped elastic member having its ends rigidly attached to one of said elements and a point intermediate its ends attached to the other of said elements.

9. In combination with a mechanical system, having a rotatable driving and a rotatable driven member, means coupling said members, comprising a pair of enclosed fluid damped elastic members, each of said members having one end rigidly attached to one of said rotatable members, means interconnecting the other ends of said elastic members, and means connecting said interconnecting means to the other of said rotatable members.

In witness whereof I hereunto subscribe my name this third day of August, A. D. 1927.

LLOYD A. ELMER.